(12) United States Patent
Lokshin et al.

(10) Patent No.: US 11,516,557 B2
(45) Date of Patent: *Nov. 29, 2022

(54) SYSTEM AND METHOD FOR ENHANCED VIDEO IMAGE RECOGNITION USING MOTION SENSORS

(71) Applicant: AlpineReplay, Inc., Huntington Beach, CA (US)

(72) Inventors: David J. Lokshin, Huntington Beach, CA (US); Anatole M. Lokshin, Huntington Beach, CA (US); Claire Louise Roberts-Thomson, Ann Arbor, MI (US)

(73) Assignee: AlpineReplay, Inc., Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,071

(22) Filed: Jan. 15, 2021

(65) Prior Publication Data

US 2021/0136466 A1     May 6, 2021

Related U.S. Application Data

(63) Continuation of application No. 16/401,017, filed on May 1, 2019, now Pat. No. 10,897,659, which is a
(Continued)

(51) Int. Cl.
*H04N 21/8547* (2011.01)
*G06K 9/62* (2022.01)
(Continued)

(52) U.S. Cl.
CPC ....... *H04N 21/8547* (2013.01); *G06K 9/6271* (2013.01); *G06V 10/454* (2022.01);
(Continued)

(58) Field of Classification Search
CPC .......... H04N 21/8547; H04N 21/8456; G11B 27/031; G11B 27/28; G11B 27/3036;
(Continued)

(56) References Cited

U.S. PATENT DOCUMENTS

| 4,800,897 A | 1/1989 | Nilsson |
| 5,067,717 A | 11/1991 | Harlan et al. |

(Continued)

FOREIGN PATENT DOCUMENTS

| CN | 1308505 | 8/2001 |
| CN | 1533672 | 9/2004 |

(Continued)

OTHER PUBLICATIONS

Chinese Patent Application No. 201380020481.6, Search Report.
(Continued)

*Primary Examiner* — Luong T Nguyen
(74) *Attorney, Agent, or Firm* — Greenberg Traurig (57) ABSTRACT

Disclosed are systems and methods for improving image recognition by using information from sensor data. In one embodiment, the method comprises receiving one or more sensor records, the sensor records representing timestamped sensor data collected by a sensor recording device; selecting an event based on the sensor records; identifying a time associated with the event; retrieving a plurality of timestamped video frames; synchronizing the sensor records and the video frames, wherein synchronizing the sensor records and the video frames comprises synchronizing the timestamped sensor data with individual frames of the timestamped video frames according to a common timeframe; and selecting a subset of video frames from the plurality of timestamped video frames based on the selected event.

18 Claims, 7 Drawing Sheets

Related U.S. Application Data continuation of application No. 15/334,131, filed on Oct. 25, 2016, now Pat. No. 10,321,208.

(60) Provisional application No. 62/246,324, filed on Oct. 26, 2015.

(51) Int. Cl.

| | | |
|---|---|---|
| *H04N 21/845* | (2011.01) | |
| *G11B 27/031* | (2006.01) | |
| *G11B 27/28* | (2006.01) | |
| *G11B 27/30* | (2006.01) | |
| *G06V 10/44* | (2022.01) | |
| *G06V 20/40* | (2022.01) | |
| *G06V 20/52* | (2022.01) | |

(52) U.S. Cl.
CPC ............ *G06V 20/41* (2022.01); *G06V 20/52* (2022.01); *G11B 27/031* (2013.01); *G11B 27/28* (2013.01); *G11B 27/3036* (2013.01); *H04N 21/8456* (2013.01); *G06V 20/44* (2022.01)

(58) Field of Classification Search
CPC ............ G06K 9/00771; G06K 9/4628; G06K 9/6271; G06K 9/00718; G06K 2009/00738; G06V 10/454; G06V 20/41; G06V 20/52; G06V 20/44; G06V 10/82
See application file for complete search history.

(56) References Cited

U.S. PATENT DOCUMENTS

| | | | |
|---|---|---|---|
| 5,337,758 A | 8/1994 | Moore et al. | |
| 5,724,265 A | 3/1998 | Hutchings | |
| 6,167,356 A | 12/2000 | Squadron et al. | |
| 6,499,000 B2 | 12/2002 | Flentov et al. | |
| 6,571,193 B1 | 5/2003 | Unuma et al. | |
| 6,825,777 B2 | 11/2004 | Vock et al. | |
| 6,963,818 B2 | 11/2005 | Flentov et al. | |
| 7,451,056 B2 | 11/2008 | Flentov et al. | |
| 7,602,301 B1 | 10/2009 | Stirling et al. | |
| 7,631,808 B2 | 12/2009 | Kundu et al. | |
| 7,640,135 B2 | 12/2009 | Vock et al. | |
| 7,827,000 B2 | 11/2010 | Stirling et al. | |
| 7,843,510 B1* | 11/2010 | Ayer .................... | H04N 5/265 348/584 |
| 7,860,666 B2 | 12/2010 | Vock et al. | |
| 7,991,565 B2 | 8/2011 | Vock et al. | |
| 8,055,469 B2 | 11/2011 | Kulach et al. | |
| 8,239,146 B2 | 8/2012 | Vock et al. | |
| 8,270,670 B2 | 9/2012 | Chen et al. | |
| 8,628,453 B2 | 1/2014 | Balakrishnan et al. | |
| 8,929,709 B2 | 1/2015 | Lokshin | |
| 9,001,886 B2 | 4/2015 | Labrozzi et al. | |
| 9,060,682 B2 | 6/2015 | Lokshin | |
| 9,476,730 B2 | 10/2016 | Samarasekera et al. | |
| 9,497,407 B2 | 11/2016 | Lokshin | |
| 10,008,237 B2 | 6/2018 | Lokshin et al. | |
| 10,321,208 B2* | 6/2019 | Lokshin ............ | G06K 9/00771 |
| 10,408,857 B2 | 9/2019 | Lokshin et al. | |
| 10,419,715 B2 | 9/2019 | Lokshin | |
| 10,548,514 B2 | 2/2020 | Lokshin et al. | |
| 10,897,659 B2* | 1/2021 | Lokshin ............ | H04N 21/8547 |
| 2002/0115927 A1 | 8/2002 | Tsukada et al. | |
| 2003/0065257 A1 | 4/2003 | Mault et al. | |
| 2005/0223799 A1 | 10/2005 | Murphy | |
| 2006/0166737 A1 | 7/2006 | Bentley | |
| 2006/0190419 A1 | 8/2006 | Bunn et al. | |
| 2006/0247504 A1 | 11/2006 | Tice | |
| 2006/0291840 A1 | 12/2006 | Murata et al. | |
| 2007/0027367 A1 | 2/2007 | Oliver et al. | |
| 2007/0063850 A1 | 3/2007 | Devaul et al. | |
| 2008/0246841 A1* | 10/2008 | Chen .................. | H04N 1/00132 348/143 |
| 2009/0009605 A1 | 1/2009 | Ortiz | |
| 2009/0041298 A1 | 2/2009 | Sandler et al. | |
| 2009/0063097 A1 | 3/2009 | Vock et al. | |
| 2009/0088204 A1 | 4/2009 | Culbert et al. | |
| 2009/0210078 A1 | 8/2009 | Crowley | |
| 2009/0322540 A1 | 12/2009 | Richardson et al. | |
| 2010/0030482 A1 | 2/2010 | Li | |
| 2010/0081116 A1 | 4/2010 | Barasch et al. | |
| 2010/0120585 A1 | 5/2010 | Quy | |
| 2010/0149331 A1 | 6/2010 | DiMare et al. | |
| 2010/0161271 A1 | 6/2010 | Shah et al. | |
| 2010/0204615 A1 | 8/2010 | Kyle et al. | |
| 2010/0268459 A1 | 10/2010 | O'Shea | |
| 2011/0004072 A1 | 1/2011 | Fletcher et al. | |
| 2011/0007962 A1 | 1/2011 | Johnson et al. | |
| 2011/0071792 A1 | 3/2011 | Miner | |
| 2011/0208822 A1 | 8/2011 | Rathod | |
| 2011/0210915 A1 | 9/2011 | Shotton et al. | |
| 2011/0222766 A1 | 9/2011 | Kato et al. | |
| 2011/0246122 A1 | 10/2011 | Iketani et al. | |
| 2011/0270135 A1 | 11/2011 | Dooley et al. | |
| 2011/0313731 A1 | 12/2011 | Vock et al. | |
| 2012/0004883 A1 | 1/2012 | Vock et al. | |
| 2012/0113274 A1 | 5/2012 | Adhikari et al. | |
| 2012/0116548 A1 | 5/2012 | Goree et al. | |
| 2012/0130515 A1 | 5/2012 | Homsi et al. | |
| 2012/0154557 A1 | 6/2012 | Perez et al. | |
| 2012/0178534 A1 | 7/2012 | Ferguson et al. | |
| 2012/0191705 A1 | 7/2012 | Tong et al. | |
| 2013/0044043 A1 | 2/2013 | Abdollahi et al. | |
| 2013/0176401 A1 | 7/2013 | Monari et al. | |
| 2013/0218504 A1 | 8/2013 | Fall et al. | |
| 2013/0274040 A1 | 10/2013 | Coza et al. | |
| 2013/0278727 A1 | 10/2013 | Tamir et al. | |
| 2013/0316840 A1 | 11/2013 | Marks | |
| 2013/0330054 A1 | 12/2013 | Lokshin | |
| 2014/0028855 A1 | 1/2014 | Pryor | |
| 2014/0120838 A1 | 5/2014 | Lokshin | |
| 2014/0257743 A1 | 9/2014 | Lokshin et al. | |
| 2014/0257744 A1 | 9/2014 | Lokshin et al. | |
| 2015/0050972 A1 | 2/2015 | Sarrafzadeh et al. | |
| 2015/0098688 A1* | 4/2015 | Lokshin ................. | H04N 5/247 386/227 |
| 2015/0335949 A1 | 11/2015 | Lokshin et al. | |
| 2015/0340066 A1 | 11/2015 | Lokshin et al. | |
| 2016/0042493 A1 | 2/2016 | MacMillan et al. | |
| 2017/0026608 A1 | 1/2017 | Lokshin | |
| 2017/0106238 A1 | 4/2017 | Lokshin et al. | |
| 2017/0118539 A1 | 4/2017 | Lokshin et al. | |
| 2017/0262697 A1 | 9/2017 | Kaps et al. | |
| 2019/0261065 A1 | 8/2019 | Lokshin et al. | |

FOREIGN PATENT DOCUMENTS

| | | |
|---|---|---|
| CN | 1907222 | 2/2007 |
| EP | 0866949 | 9/1998 |
| JP | 2001317959 | 11/2001 |
| JP | 2003244691 | 8/2003 |
| JP | 2005286377 | 10/2005 |
| JP | 2006345270 | 12/2006 |
| JP | 2009065324 | 3/2009 |
| JP | 2009078134 | 4/2009 |
| JP | 2010088886 | 4/2010 |
| JP | 2012523900 | 10/2012 |
| WO | 2006081395 | 8/2006 |
| WO | 2007006346 | 1/2007 |
| WO | 2010025467 | 3/2010 |
| WO | 2011069291 | 6/2011 |
| WO | 2011101858 | 8/2011 |
| WO | 2011140095 | 10/2011 |
| WO | 2012027626 | 3/2012 |

OTHER PUBLICATIONS

European Patent Application No. 12886942.7, Extended Search Report, dated Sep. 22, 2015.

(56) References Cited

OTHER PUBLICATIONS

European Patent Application No. 13876901.3, European Search Report, dated Mar. 2, 2017.
International Patent Application PCT/US2012/071867, International Search Report and Written Opinion, dated Jul. 4, 2013.
International Patent Application PCT/US2013/021122, International Search Report and Written Opinion, dated Apr. 23, 2013.
International Patent Application PCT/US2013/058807, International Search Report and Written Opinion, dated Dec. 30, 2013.
International Patent Application PCT/US2015/047251, International Search Report and Written Opinion, dated Dec. 16, 2015.
The Extended European Search Report 13804492.0, dated Nov. 20, 2015.
Tsai, A Versatile Camera Calibration Techniaue for High-Accuracy 3D Machine Vision Metrology Using Off-the-shelf TV Cameras and Lenses, IEEE Journal of Robotics and Automation, vol. RA-3, No. 4, Aug. 1987, pp. 323-344.

\* cited by examiner

SYSTEM AND METHOD FOR ENHANCED VIDEO IMAGE RECOGNITION USING MOTION SENSORS

CLAIM OF PRIORITY

The present application claims priority to U.S. patent application Ser. No. 16/401,017, filed on May 1, 2019, issued as U.S. Pat. No. 10,897,659 on Jan. 19, 2021 and titled "SYSTEM AND METHOD FOR ENHANCED VIDEO IMAGE RECOGNITION USING MOTION SENSORS," which is a continuation of U.S. patent application Ser. No. 15/334,131, filed on Oct. 25, 2016, issued as U.S. Pat. No. 10,321,208 on Jun. 11, 2019 and titled "SYSTEM AND METHOD FOR ENHANCED VIDEO IMAGE RECOGNITION USING MOTION SENSORS," which claims the benefit of the filing date of Prov. U.S. Pat. App. Ser. No. 62/246,324, filed on Oct. 26, 2015, the entire disclosures of which applications herein are hereby incorporated by reference in their entirety.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The embodiments described in the disclosure relate to the field of image processing and specifically, to systems and methods for video and image processing, image recognition, and video annotation using sensor measurements.

Recently, action videos have become very popular due to the wide availability of portable video cameras. At the same time professional and semi-professional video of sporting events have become more common and more sophisticated. To achieve near professional quality of mass sport video and to make sport video more interesting and appealing to the viewer, multiple special effects are employed. It is often very desirable to annotate video with on screen comments and data, e.g. velocity, altitude, etc. These parameter values are usually obtained from sources that are not internal or connected to the camera device. It may also be desirable to analyze activities captured in a video, compare it with other videos, or select specific parts of the video for zooming, annotation, or enhancement. To achieve these effects, multiple conditions must be satisfied.

To do this correctly, video frames capturing the selected event must be determined exactly. Since the most interesting events are often very fast motions, the time synchronization must be very accurate to provide the desired visual effect. For example, to slow down only the frames showing a skier's jump, time synchronization must be accurate to tenths of a second to create the appropriate visual effect.

For example, to select a particular part of a frame for enhancement (e.g., of a basketball player performing a dunk), a camera frame must be well calibrated to the real world three-dimensional coordinates. While camera calibration is well known (e.g. Tsai, Roger Y. (1987) "A Versatile Camera Calibration Technique for High Accuracy 3D Machine Vision Metrology Using Off-the-Shelf TV Cameras and Lenses," IEEE Journal of Robotics and Automation, Vol. RA-3, No. 4, August 1987, pp. 323-344), for a mass market adaptation such procedures must be highly automated with a possible use of image recognition of the sample target in the video frame.

There are methods that sync camera time and sensor time by using a common time source such as GPS or network time (e.g., commonly owned U.S. Pat. No. 8,929,709). Such methods require an accurate time source in both camera and sensor. Unfortunately, some cameras don't allow very accurate sub-second timestamps. Therefore, additional synchronization tuning is required. Image recognition methods can determine the video frame where a particular action starts or ends and, therefore, allow synchronization up to the time resolution of a frame.

A separate requirement may be the graphical enhancement of the video by adding graphics to particular images in the frame, such as a person's face, etc.

Image recognition has become a common part of the video and image processing. It is used to recognize particular images, like faces, cars, animals, or recognize and track particular objects or activities, say athlete jumping or moving.

In all the above applications image recognition methods are very CPU intensive. To make video image analysis efficient one needs to know what kind of motion or image to search for. Modern automatic cameras and drones that can work in autonomous or "start and forget" modes produce gigabytes of video data that needs to be analyzed for image recognition. Therefore, for efficient image recognition, it is very advantageous to know the range of frames in which to search for the desired images and an area of the screen where such images should appear.

BRIEF SUMMARY

Embodiments of the disclosure overcome the aforementioned difficulties by combining sensor and video processing to provide multiple advantages.

Even non-perfect time synchronization between sensor data and video frames can significantly improve efficiency of video image recognition. Using image recognition, in return, significantly improves time synchronization between sensors and the video by identifying an exact frame where a particular sensor detected action starts, ends, or occurs. Further improvement in video recognition can be achieved by identifying a screen area and predicted pixel motion by mapping sensor-derived three-dimensional position and motion into two dimensional camera frame coordinates.

This sensor-camera time and position synchronization creates a virtue cycle where simple feature recognition allows accurate 3D to 2D sensor-camera mapping, which then automatically creates a large number of samples for video recognition to learn more complicated motion via deep learning, neural networks, algorithmically, or any other method, which then allows reverse mapping of image recognized motions into world 3D/time space even for the subjects, machines or equipment that don't have attached sensors.

Specifically, in one embodiment, the disclosure describes a method for improving image recognition by using information from sensor data. The method may comprise receiving one or more sensor records, the sensor records representing timestamped sensor data collected by a sensor recording device; selecting an event based on the sensor records; identifying a time associated with the event; retrieving a plurality of timestamped video frames; synchronizing the sensor records and the video frames, wherein synchronizing the sensor records and the video frames comprises synchronizing the timestamped sensor data with individual frames of the timestamped video frames according to a common timeframe; and selecting a subset of video frames from the plurality of timestamped video frames based on the selected event.

In another embodiment, the disclosure describes a system for improving image recognition by using information from sensor data. In one embodiment, the system comprises a sensor recording device configured to capture one or more sensor records, the sensor records representing timestamped sensor data collected by a sensor recording device and one or more cameras configured to record a plurality of timestamped video frames. The system further comprises an event processing system configured to receive one or more sensor records, the sensor records representing timestamped sensor data collected by a sensor recording device; select an event based on the sensor records; identify a time associated with the event; retrieve a plurality of timestamped video frames; synchronize the sensor records and the video frames, wherein synchronizing the sensor records and the video frames comprises synchronizing the timestamped sensor data with individual frames of the timestamped video frames according to a common timeframe; and select a subset of video frames from the plurality of timestamped video frames based on the selected event.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, certain example embodiments.

Disclosed herein are systems and method for embedding performance data within a video segment. In the disclosed embodiments, a plurality of cameras may be utilized to capture timestamped video of event such as sporting events. Additionally, the participants captured on video may be equipped with a sensor recording device designed to capture movement and other activity data. Generally, the systems and methods utilize the timestamps of the sensor record data and the video data to time synchronize the two streams of data.

After synchronizing the data streams, the systems and methods select a subset of the video frames for further processing. In some embodiments, the systems and methods select this subset by identifying events of interest (e.g., spins, jumps, flips) within the sensor record data and calculating a period of video footage to analyze. The systems and methods then embed the sensor record data within the video footage to provide an enhanced video stream that overlays performance data on top of the segment of video footage. Techniques for overlaying performance data are described in, for example, commonly owned U.S. Pat. No. 8,929,709 entitled "Automatic digital curation and tagging of action videos", the entire disclosure of which is incorporated herein by reference.

Figure 1:
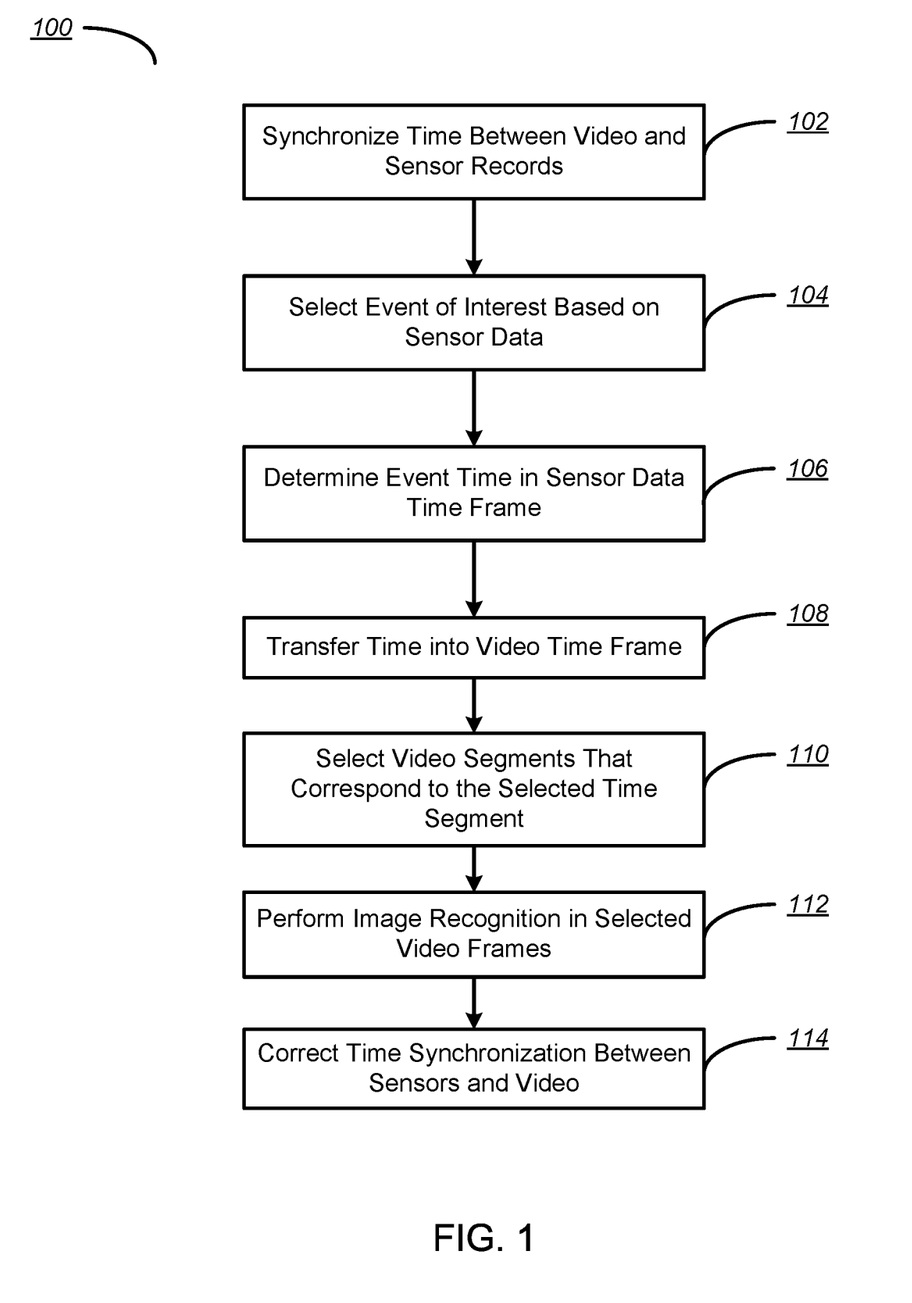
FIG. 1 is a flow diagram illustrating a method for improving image recognition by using information from sensor data according to one embodiment of the disclosure.

FIG. 1 is a flow diagram illustrating a method for automatically creating a large video training set for image recognition and deep learning based on sensor readings according to one embodiment of the disclosure.

In step 102, the method 100 synchronizes time between video and sensor records. In one embodiment, synchronizing the time between video records and sensor records may comprise synchronizing the time between video records and sensor records using a standard time reference. In one embodiment, a standard time reference may comprise a GPS time reference or a common network time reference. For example, a device capturing video data may additionally tag one or more frames with a timestamp derived from a standard time reference. Similarly, a device capturing sensor records may utilize the same standard time reference (e.g., GPS) and may associate a timestamp with each recorded event.

In step 104, the method 100 selects and event of interest based on sensor data. In one embodiment, upon receiving the video records and sensor records, the method 100 may analyze a stream of sensor records to detect when the sensor records indicate an event has occurred. For example, a stream of sensor record data may include a time-delimited stream of sensor readings corresponding to an activity (e.g., a race or other event). Within this stream of sensor records, various parameters of the sensor records may indicate that one or more subsets of the sensor record data may be associated with an event. For example, sensor records may store information regarding the acceleration, velocity, rotation, or other movement of a participant equipped with a performance recording device. During an event, sensor records may record aberrant readings when compared to the majority of the sensor records. For example, if a participant is a skier and performs a rotational movement (e.g., a spin), rotational sensor readings may be recorded to indicate as such. Thus, the method 100 may analyze the stream of sensor records to determine such anomalous readings and identify those readings as a potential event of interest. In some embodiments, events may comprise various events such as jumps, flips, rotations, high speed movement, turns, or any other finite portion of a user's performance that may be of interest.

In step 106, the method 100 determines an event time in a sensor data time frame after identifying a potential event of interest. As discussed above, the method 100 may first identify a set of sensor records that correspond to a potential event. In step 106, the method then identifies a time ($T_{SNS}$) associated with the event. In one embodiment, $T_{SNS}$ may comprise a point within a range of sensor readings. For example, sensor readings for a "spin" event may span multiple seconds. In one embodiment, the method 100 identifies the point $T_{SNS}$ as a moment in time occurring between the start and end of the spin, such as the midpoint of the event. Thus, in step 106, the method 100 converts a stream of sensor records into a limited set of "markers" that indicate when an event has occurred, the markers each being associated with a timestamp recorded using a standard time reference (e.g., GPS).

In step 108, the method 100 transfers the time, or times, determined in step 106 into the video time frame. In one embodiment, transferring the time or times determined in step 106 may comprise converting the time, $T_{SNS}$, to a timestamp ($T_V$) associated with video data. In one embodiment, determining a timestamp Tvmay comprise applying a synchronization function to the timestamp $T_{SNS}$ to obtain $T_V$.

In one embodiment, there may be clock drift between the standard time references used by the device recording sensor record data and the device recording video record data. To offset this drift, the method 100 may apply a linear transformation to the camera and/or sensor time if the video record frames and corresponding sensor times are known. In alternative embodiments, the method 100 may utilize this transformation as a synchronization function and may apply the synchronization function to the all video record data.

In step 110, the method 100 selects video segments that correspond to the selected time segment obtained in step 106. In one embodiment, the method 100 may utilize the timestamp $T_V$ in order to obtain a time period to extract video segments from a video database. In one embodiment, the method 100 may select a period T and may select video segments from a video database that were recorded between Tv−T and Tv+T In one embodiment, a period T may be predetermined (e.g., a standard 1 or 2 second period may be used). In alternative embodiments, the method 100 may determine a period Tbased on the sensor record data or video record data. In one embodiment, the method 100 may determine a period Tbased on sensor record data by determining a time period in which sensor record data is anomalous. For example, during a "spin" event, rotational data may be abnormal for a period of 3 seconds. If so, the method 100 may set T as 3 seconds based on the sensor data. In alternative embodiments, the method 100 may set Tbased on analyzing the changes in frames of video record data. For example, starting at $T_V$, the method 100 may analyze the preceding and subsequent frames and calculate the similarity between the preceding and subsequent frames to the frame at $T_V$.

In some embodiments, selecting a video segment may additionally comprise selecting only a portion of each of the video frames present within the video segment. In this embodiment, the portion of the video frames may be selected based on detecting movement of a participant in the video. For example, the method 100 may analyze the video segment to identify those pixels which change between frames. The method 100 may then identify a bounding box that captures all changing pixels and select only pixels within the bounding box for each frame.

In step 112, the method 100 performs image recognition on the selected frames or sub-frames. By performing image recognition on selected frames, CPU/GPU processing load is significantly reduced and recognition probability and performance is increased. Image recognition can be done by a multitude of methods known in the art.

In step 114, using the result of the image recognition obtained in step 112, the method 100 improves time synchronization between sensors and video up to a one frame time resolution. As an example this could be done by detecting jump start or the first landing video frame. This step may be not required if an initial time synchronization is accurate to better than one video frame time interval.

Although illustrated using a single event, the method 100 may be performed for multiple events occurring within a stream of sensor record data. For example, the method 100 may be executed for each event detected during an athlete's performance (e.g., a downhill skiing race).

Figure 2:
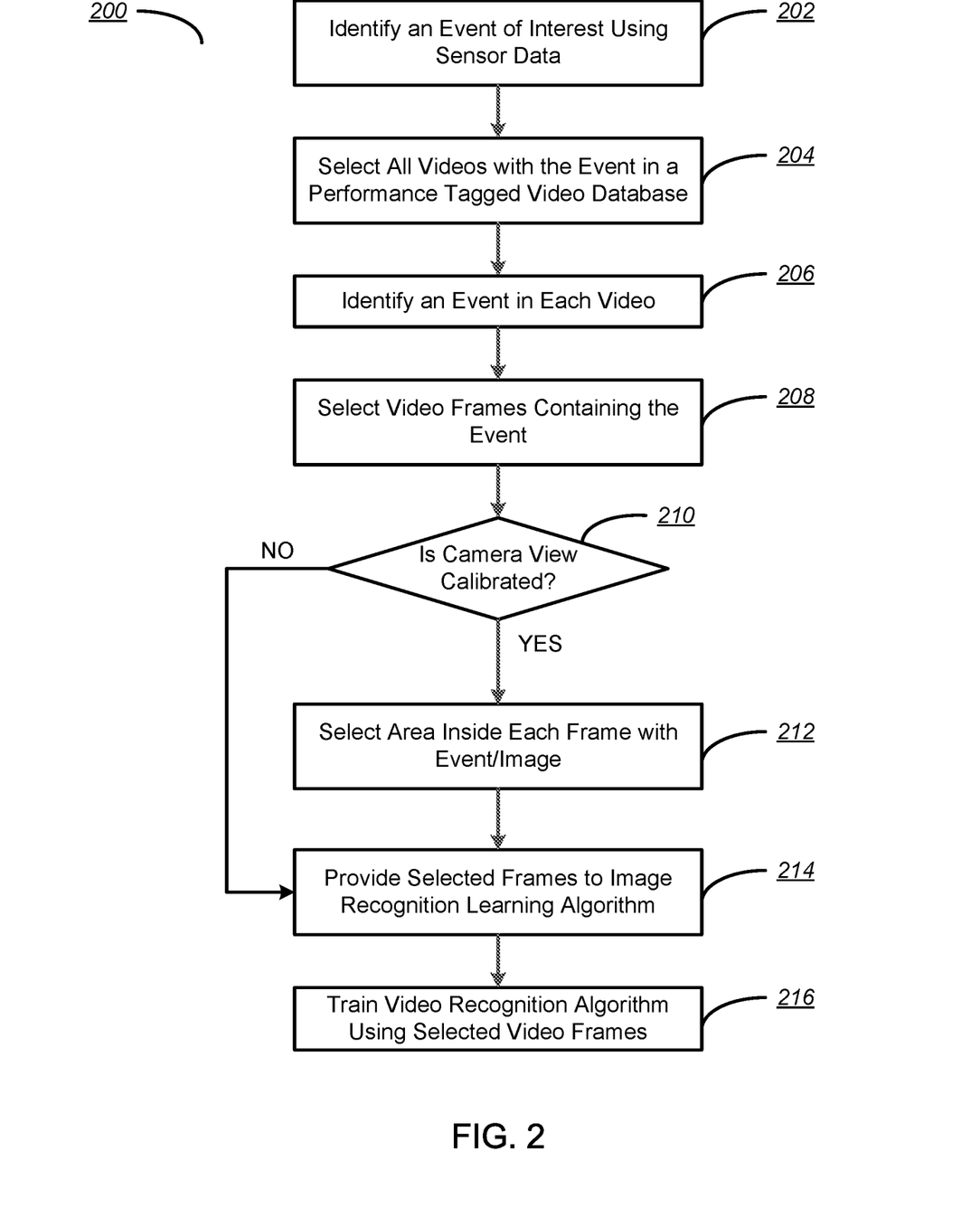
FIG. 2 is a flow diagram illustrating a method for automatically creating a large video training set for image recognition and deep learning based on sensor readings according to one embodiment of the disclosure.

FIG. 2 is a flow diagram illustrating a method for automatically creating a large video training set for image recognition and deep learning based on sensor readings according to one embodiment of the disclosure.

In step 202, the method 200 identifies an event of interest using sensor data. As described more fully in connection with FIGS. 4 through 7, multiple performers may be equipped with a sensor reading device which records sensor record data regarding the performer such as the performer's acceleration, velocity, etc. This sensor record data may be received by the method 200. In response, the method 200 may analyze a stream of sensor record data (e.g., data associated with a race or event) and identify one or more events, such as spins, flips, rotations, etc., based on anomalies detected within the sensor record data.

In alternative embodiments, the method 200 may not receive sensor record data directly from a sensor recording device when identifying an event of interest using sensor record data. In this embodiment, the method 200 may have previously received sensor record data from, for example, databases. The method 200 may use this data to train a machine learning algorithm or predictive model to automatically detect participants in a video. Specifically, the method 200 may provide, as inputs to a machine learning algorithm or predictive model, sensor record data and video frames previously synchronized with the sensor record data. The machine learning algorithm or predictive model may then use these inputs as a training set to automatically classify video frames based on the sensor record data. Specifically, the changes in pixels of video frames may be classified by the machine learning algorithm or predictive model using the sensor record data to predict future events without the need for explicit sensor record data. In this manner, the method 200 may generate a machine learning algorithm or predictive model that receives video frames and can predict the type of event occurring within the video frames. Alternatively, or in conjunction with the foregoing, the machine learning algorithm or predictive model may also be trained to predict various performance data associated with the video feeds such as velocity, acceleration, event type, etc.

In step 204, the method 200 selects all videos that contain an event of interest from a performance tagged video data base. In some embodiments, the video have metadata that described such events in the video frames or there are retrieved from a related sensory database that enables the identification of such events.

In step 206, the method 200 identifies an event in each video. This can be done by time synchronization between sensors and video or directly from video tags or metadata if present. In one embodiment, tags may be generated during event sensor processing and event identification.

In step 208, the method 200 selects only frames where selected feature or event is present. This could be done by using time synchronization or directly from tags or metadata associated with video. In one embodiment, the method 200 may synchronize the operational cameras with sensor record data as described in connection with FIG. 1 and, specifically, as described in connection with step 108.

In step 210 and 212, if camera field of view is calibrated, then an area or sub-region of each frame is selected to simplify image recognition.

In step 214 the method 200 provides selected video frames that contain selected feature of interest to an image recognition learning algorithm. These video clips taken by different cameras during multiple events from different angles represent a sample environment for algorithm training and verification. In addition such metadata as camera parameters, distance, focus, and viewing angle can be provided to the learning algorithm as well. This data can be derived from the sensory information about camera and events.

In step 216, the method 200 trains video recognition algorithms using the entirety of the selected video frames and their tags and meta data.

Alternatively, or in conjunction with the foregoing, the method 200 may further be configured to automatically recalibrate the operational cameras based on the results of the method 200. For example, the method 200 may be configured to utilize a machine learning algorithm or predictive model to classify unknown parameters of the operational cameras (e.g., angle, focus, etc.). For example, the method 200 may utilize sensor record data to compute a three-dimensional position of the user recording the sensor record data and may generate updated focus parameters to automatically recalibrate the operational cameras. Alternatively, the method 200 may provide updated parameters for operational cameras to a camera operator for manual calibration.

In another embodiment, the method 200 may further be configured to calculate a three-dimensional position of the sensor recording device for each frame in the subset of video frames. After calculating these positions, the method 200 may determine a set of image areas for each frame in the subset of video frames, the image areas framing a participant equipped with the sensor recording device. Finally, the method 200 may digitally zoom each frame in the subset of video frames based on the set of image areas.

Although illustrated using a single event, the method 200 may be performed for multiple events occurring within a stream of sensor record data. For example, the method 200 may be executed for each event detected during an athlete's performance (e.g., a downhill skiing race).

Figure 3:
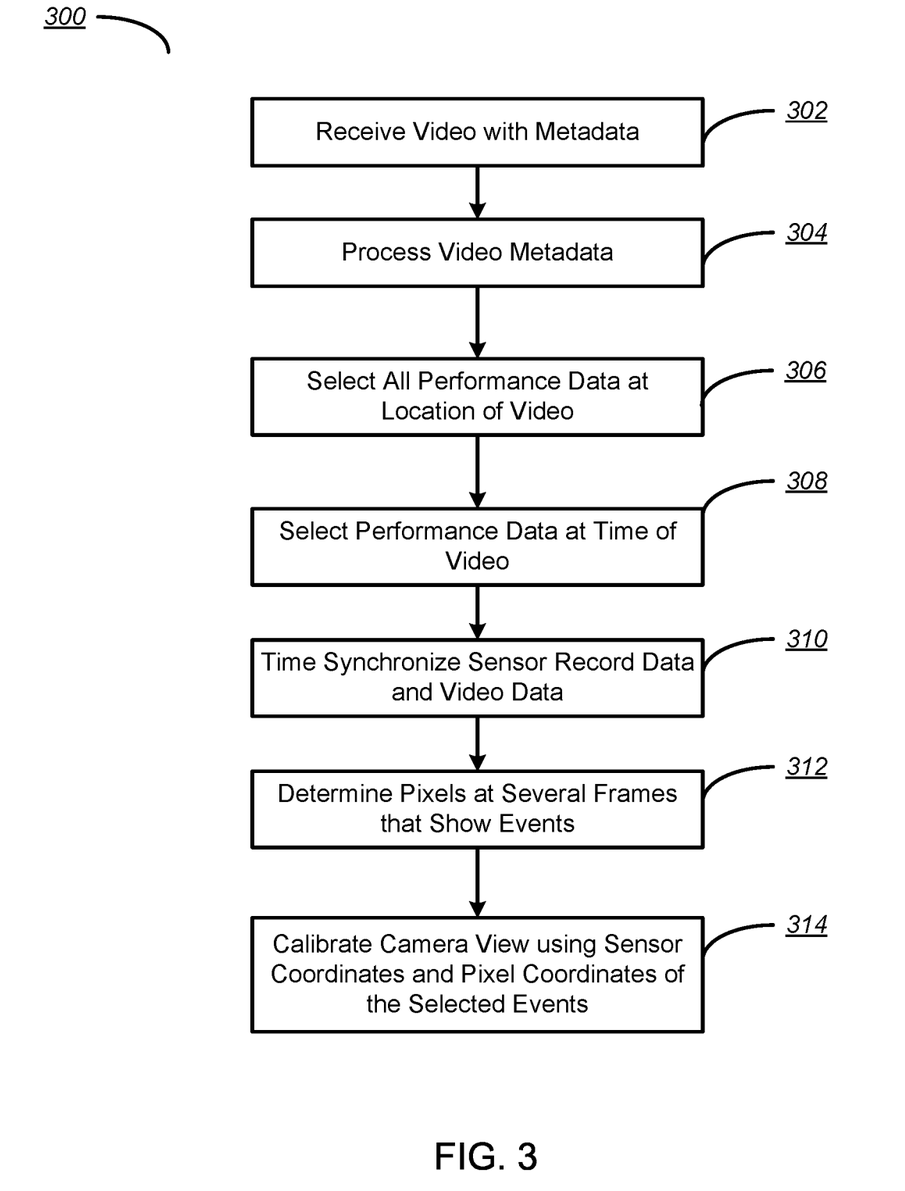
FIG. 3 is a flow diagram illustrating a method for camera calibration based on sensor readings according to one embodiment of the disclosure.

FIG. 3 is a flow diagram illustrating a method for camera calibration based on sensor readings according to one embodiment of the disclosure.

In step 302, the method 300 receives video data with associated metadata. As discussed in connection with the preceding Figures, video data may comprise video data captured during an event, such as a sporting event. In some embodiments, video data may be recorded live while in other embodiments, the method 300 may receive stored video from a user. For example, the method 300 may be implemented by a server-based media platform, wherein users upload video data to the server for sharing among other users. In some embodiments, metadata associated with the video data may include information related to the video or the participants in the video. For example, metadata may include the geographic location of the video, the date and/or time the video was taken, and, as discussed further herein, a user identifier associated with the video. In one embodiment, a user identifier may comprise a numeric identifier, a username, an e-mail address, or any other data that uniquely identifies a user.

In step 304, the method 300 processes the video metadata. In one embodiment, processing the video metadata may comprise extracting the video metadata from a video file or associated database. For example, the method 300 may receive a single, flat file containing video data and metadata. The method 300 may then split the single file into video data and associated metadata. Alternatively, or in conjunction with the foregoing, the method 300 may reformat the received video metadata into a format useable for later processing. For example, video metadata may comprise binary data that the method 300 may convert into a structured format such as JSON or XML.

In step 306 and 308, the method 300 selects performance data associated with this video. In one embodiment, selecting performance data may comprising selecting performance data based on a user identifier (ID) present within the video metadata, or by selecting data from a performance database that has the same time and location tag or metadata as the video performance database. In some embodiments, the method 300 may isolate performance data upon determining that a user ID is present within the video metadata. In one embodiment, the method 300 may perform steps 306 and 308 to limit the amount of performance data processed in later steps based on the presence of a user identifier.

In step 310, the method 300 time synchronizes video frames and performance data unless both databases are already synchronized to a common time frame.

In step 312, the method 300 determines the actual pixels in each frame where a particular event or feature(s) is present. In one embodiment, a feature may comprise a particular user, user equipment, or the actual sensor that provides sensory data for this event. For example, in each frame the pixels that correspond to a surfer's location (or the tip of the surfboard where sensor is located) are identified. In one embodiment this pixel identification is done manually, in another embodiment this is done via image recognition, or semi-automatically by providing one or more pixels in the first frame and then using image recognition in each following video frame.

In step 314, the method 300 calibrates a camera field of view by using pairs of real world sensor coordinates and video frame pixel locations for the same event since both time frames were previously synchronized by the method 300. The actual calibration can be done by any of the multiple methods that are well known to the practitioners of the art, such as those described in Tsai, Roger Y. (1987) "A Versatile Camera Calibration Technique for High Accuracy 3D Machine Vision Metrology Using Off-the-Shelf TV Cameras and Lenses," IEEE Journal of Robotics and Automation, Vol. RA-3, No. 4, August 1987, pp. 323-344.

Therefore, a camera field of view may be accurately calibrated and may be used to provide an accurate mapping between real world coordinates and pixels for better image recognition, view selection, selected digital zoom, or use of multiple cameras for virtual reality or 3D synthetic views.

Figure 4:
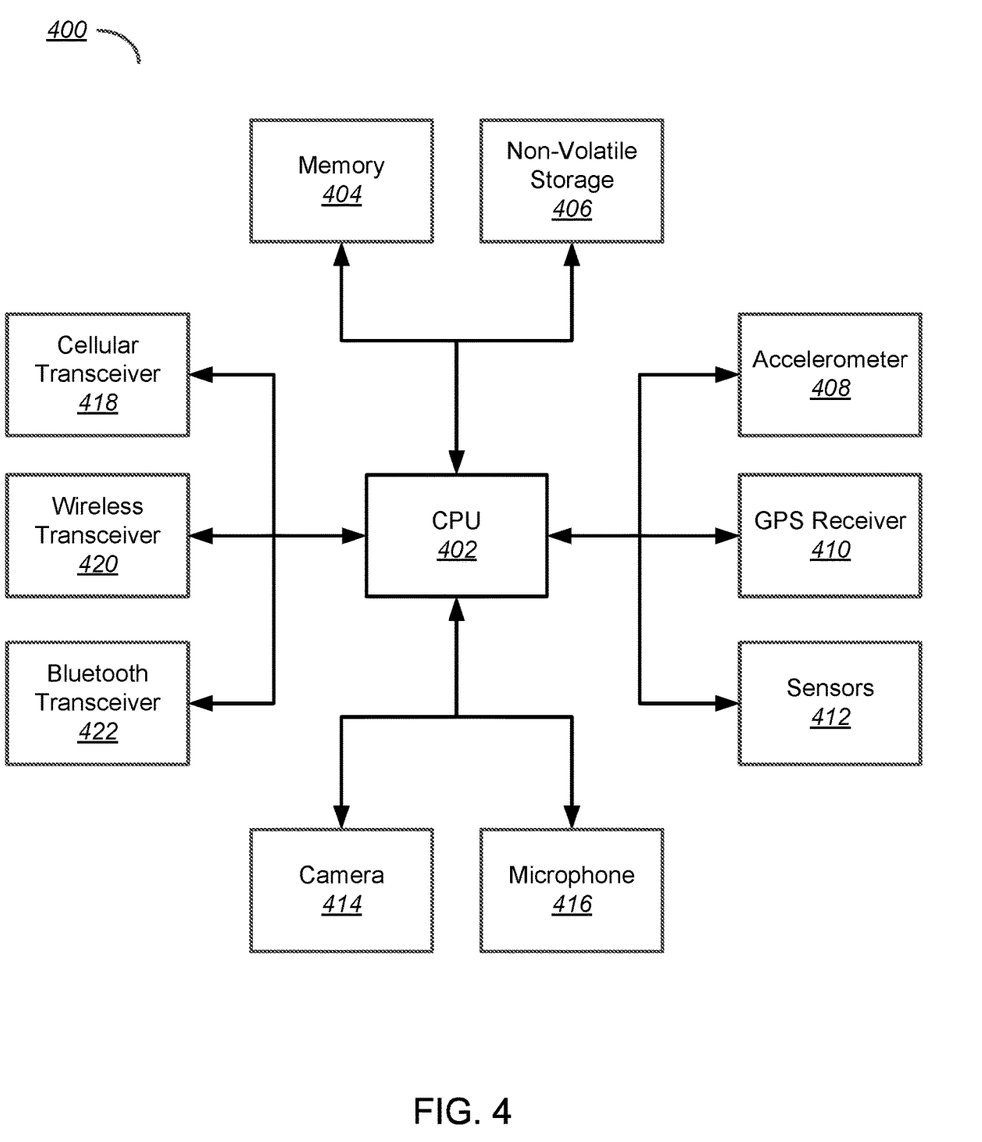
FIG. 4 is a block diagram illustrating a video and sensor processing device according to one embodiment of the disclosure.

FIG. 4 is a block diagram illustrating a video and sensor processing device according to one embodiment of the disclosure. The device 400 includes a CPU 402, memory 404, non-volatile storage 406, accelerometer 408, GPS receiver 410, sensors 412, camera 414, microphone 116, cellular transceiver 418, Bluetooth transceiver 422, and wireless transceiver 420.

In the illustrated embodiment, the device 400 may comprise a computing device designed to be worn, or otherwise carried, by a user. The device 400 includes an accelerometer 408 and GPS receiver 410 which monitor the device 400 to identify its position (via GPS receiver 410) and its acceleration (via accelerometer 408). Additionally, the device 400 includes one or more sensors 412 that may record additional data regarding the activity of the device 400. For example, sensors 412 may include speedometers, tachometers, pedometers, biometric sensors, or other sensor reading devices. Although illustrated as single components, accelerometer 408, GPS receiver 410, and sensors 412 may alternatively each include multiple components providing similar functionality.

Accelerometer 408, GPS receiver 410, and sensors 412 generate data, as described in more detail herein, and transmit the data to other components via CPU 402. Alternatively, or in conjunction with the foregoing, accelerometer 408, GPS receiver 410, and sensors 412 may transmit data to memory 404 for short-term storage. In one embodiment, memory 404 may comprise a random access memory device or similar volatile storage device. Alternatively, or in conjunction with the foregoing, accelerometer 408, GPS receiver 410, and sensors 412 may transmit data directly to non-volatile storage 406. In this embodiment, CPU 402 may access the data (e.g., location and/or sensor data) from memory 404. In some embodiments, non-volatile storage 406 may comprise a solid-state storage device (e.g., a "flash" storage device) or a traditional storage device (e.g., a hard disk). Specifically, GPS receiver 410 may transmit location data (e.g., latitude, longitude, etc.) to CPU 402, memory 404, or non-volatile storage 406 in similar manners. In some embodiments, CPU 402 may comprise a field programmable gate array or customized application-specific integrated circuit.

Device 400 additionally includes camera 414 and microphone 416. Camera 414 and microphone 416 may be capable of recording audio and video signals and transmitting these signals to CPU 402 for long term storage in non-volatile storage 406 or short-term storage 104.

As illustrated in FIG. 4, the device 400 includes multiple network interfaces including cellular transceiver 418, wireless transceiver 420, and Bluetooth transceiver 422. Cellular transceiver 418 enables the device 400 to transmit performance or audio/video data, processed by CPU 402, to a server via a mobile or radio network. Additionally, CPU 402 may determine the format and contents of data transferred using cellular transceiver 418, wireless transceiver 420, and Bluetooth transceiver 422 based upon detected network conditions.

Figure 5:
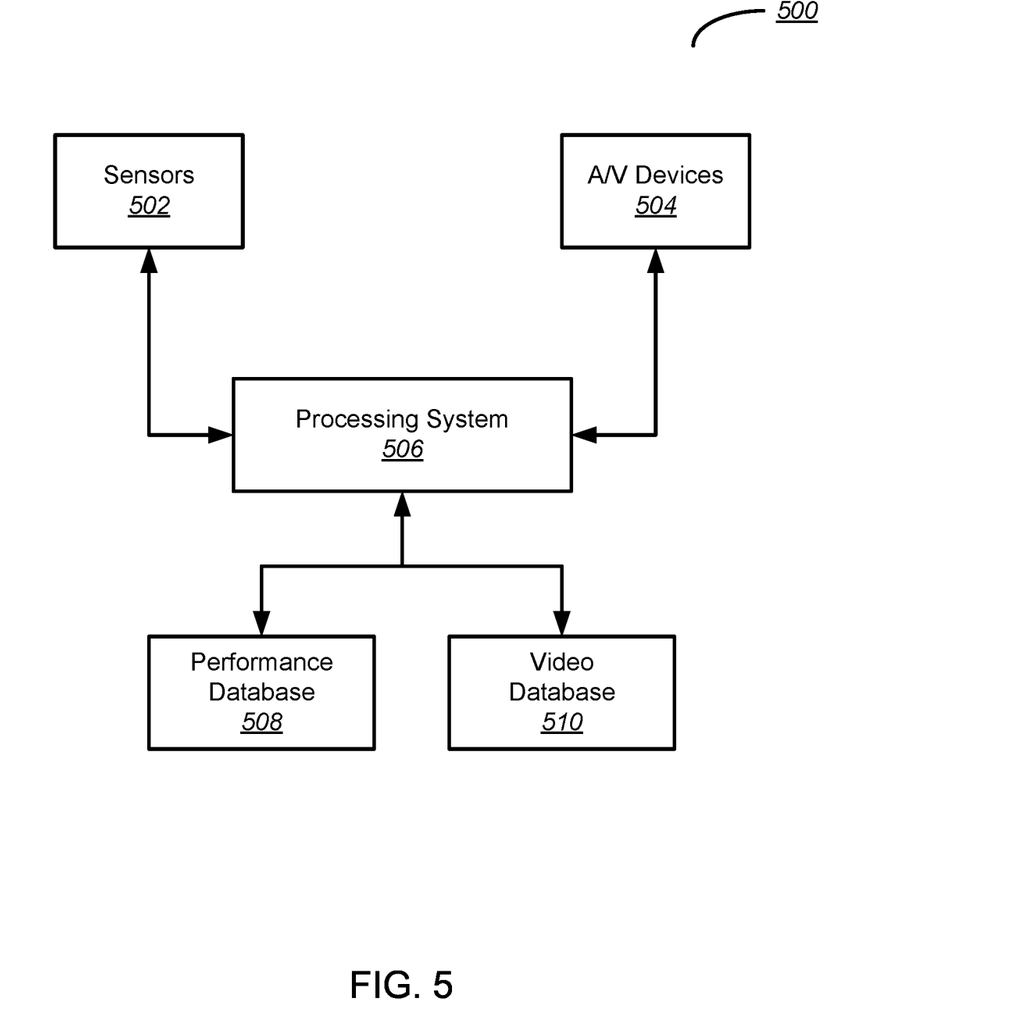
FIG. 5 is a block diagram illustrating a system for enhanced video image recognition according to one embodiment of the disclosure.

FIG. 5 is a block diagram illustrating a system for enhanced video image recognition according to one embodiment of the disclosure.

As illustrated in FIG. 5, a plurality of sensors 502 and audio/visual capture devices 504 transmit data to processing system 506. In one embodiment, sensors 502 may comprise a variety of sensors used to record the movement of a device (and user of the device) during a finite period of time. In some embodiments, sensors 502 may comprise gyroscopes, accelerometers, pedometers, speedometers, tachometers, and any other sensor-based device capable of recording data relating to the movement of a device or user of the device. In alternative embodiments, sensors 502 may additionally include biometric sensors.

Audio/visual capture devices 504 may include one or more video cameras, still cameras, microphones, three-dimensional cameras, or any other devices capable of recording multimedia data.

Although illustrated as single elements, sensors 502 may comprise a distributed network of sensors installed in multiple performance recording devices. For example, processing system 506 may receive data from multiple performance recording devices operated by multiple users. Each of these performance recording devices may include one or more sensors as described above.

Likewise, audio/visual capture devices 504 may comprise multiple audio/visual capture devices, each recording data and transmitting that data to processing system 506. For example, audio/visual capture devices 504 may include personal recording devices as well as fixed recording devices.

In one embodiment, the system 500 may be a locally-installed system. For example, the system 500 may be installed at a known location of an event for processing data specific to that event and location. Alternatively, system 500 may comprise a globally-available system wherein devices providing video and/or performance data may be located throughout the world. In this embodiment, processing system 506 may comprise single server-based device or multiple server-based devices (co-located or distributed) processing data simultaneously.

As illustrated in FIG. 5, the system 500 includes a processing system 506. In one embodiment, processing system 506 may comprise a device, or multiple devices, receiving sensor data and audio/video data from sensors 502 and audio/video capture devices 504.

In one embodiment, processing system 506 is capable of processing the received data and storing the received data in performance database 508 or video database 510. Embodiments of the structure of performance database 508 and video database 510 are described more fully with respect to FIG. 6, the description of which is incorporated herein in its entirety.

In addition to processing and storing received data, processing system 506 may further be configured to embed performance data within video data and transmit the combined data to an output device (e.g., a display device, network connection, or other communications channel). The processing of video data to include performance data is described more fully with respect to FIGS. 1 through 3, the descriptions of which are incorporated herein in their entirety.

Figure 6:
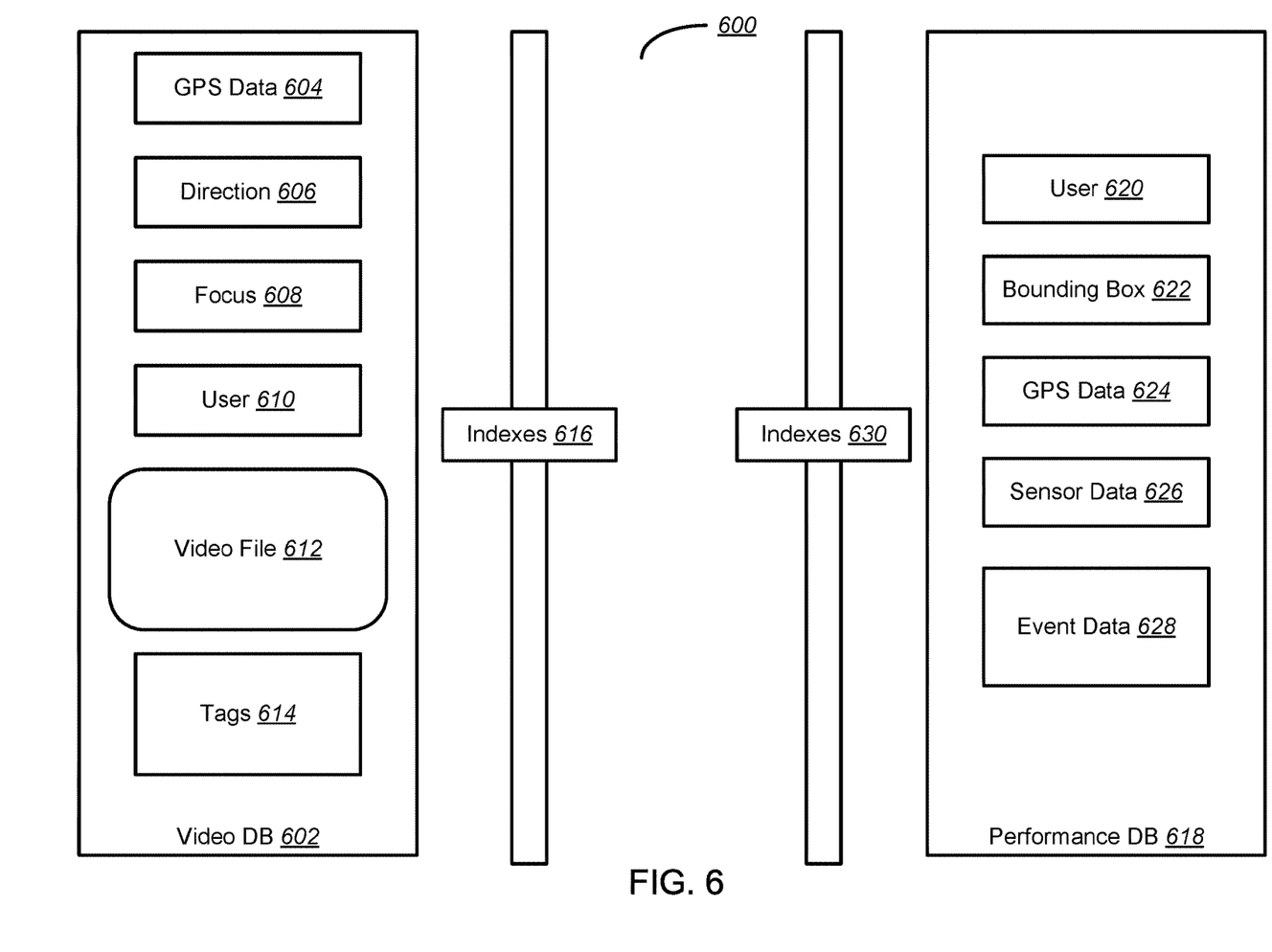
FIG. 6 is a block diagram illustrating a database system for enhanced video image recognition according to one embodiment of the disclosure.

FIG. 6 is a block diagram illustrating a database system for enhanced video image recognition according to one embodiment of the disclosure.

In the embodiment illustrated in FIG. 6, database system 600 includes a video database 602 and a performance database 618. Each database 602, 618 may contain indexes 616, 630, respectively. In one embodiment, indexes 616, 630 may comprise various indexes used for the retrieval of information from databases 602, 618. For example, indexes 616, 630 may comprise bitmap indexes (e.g., B+trees), dense indexes, reverse indexes, or sparse indexes, as applicable.

Video database 602 may comprise various data structures or fields for storing information related to captured video. As described herein, video data may be captured by one or more cameras associated with a user or with an event. In one embodiment, video capture devices may transmit data to database system 600 for processing and storage.

Video database 602 includes a GPS data storage component 604. In one embodiment, video database 602 may store the GPS coordinates associated with a camera transmitting video data to database system 600. GPS data may include the latitude, longitude, and altitude of the camera supplying data to video database 602. In one embodiment, GPS data may be constant over time. In other embodiments, GPS data may comprise a time sequence of GPS coordinates if the camera is mobile.

Video database 602 additionally includes direction storage component 606. In one embodiment, direction storage component 606 may store information regarding the direction a camera is positioned during the capture of video data. In one embodiment, direction data may comprise a three dimensional representation of the angle in which the camera is positioned. In one embodiment, direction information may be constant. In other embodiments, direction information may comprise a time sequence of x, y, and z coordinates if the camera is mobile.

Video database 602 additionally includes focus storage component 608. In one embodiment, focus storage component 608 stores information regarding the focal length of the camera transmitting video data to database system 600.

Video database 602 additionally includes user storage component 610. In one embodiment, user storage component 610 may store user information relating to the user capturing the video transmitted to database system 600. In one embodiment, video may be captured by devices own and operated by users (e.g., portable video cameras, cellphones, etc.). Each of these devices may be associated with a user (e.g., via an application requiring a login, via a MAC address, etc.). In alternative embodiments, video database 602 may not record user information if the camera is not associated with a specific user (e.g., if the camera is operated by an organization). Alternatively, the video database 602 may record the organization as the user within user storage component 610.

Video database 602 additionally includes video file storage component 612. In one embodiment, video file storage 612 may comprise a storage device for storing raw video data, such as a filesystem. Alternatively, video file storage component 612 may comprise a special purpose database for storing video data. In some embodiments, video file storage component 612 may comprise a remote "cloud"-based storage device.

Video database 602 additionally includes tag storage component 614. In one embodiment, tag storage component may store additional annotations regarding video data transmitted to video database 602. In one embodiment, video data may be captured by users and transmitted to database system 600. Prior to transmitting the video data, the user may add additional tags or annotations to the video data via an application (e.g., a mobile application). For example, a user may add tags describing the actions in the video, the scene of the video, or any other information deemed relevant by the user.

Performance database 618 may comprise various data structures or fields for storing information related to performance data captured by performance recording devices. As described herein, performance data may be captured by one or more performance recording devices associated with a user. In one embodiment, performance recording devices may transmit data to database system 600 for processing and storage. Alternatively, performance database 618 may be stored locally within the performance recording device.

Performance database 618 includes a user storage component 620. In one embodiment, user storage component 620 stores user information associated with the owner or operator of a performance recording device transmitting sensor record data to performance database 618. For example, a user may be equipped with a performance recording device that has been setup for use by that specific user. Thus, the performance recording device may be associated with an identifier uniquely identifying the user. When transmitting performance data to performance database 618, the performance recording device may additionally provide the user identifier which database system 600 may store in performance database 618 via user storage component 620.

Performance database 618 additionally includes a bounding box storage component 622. In one embodiment, a performance recording device may supply bounding box information to database system 602 for storage in bounding box storage component 622. In one embodiment, a bounding box may comprise an estimate rectangular area surrounding the performance recording device and/or user. In one embodiment, a bounding box may comprise a fixed rectangular area; alternatively, the bounding box information may be updated as the performance recording device moves.

Performance database 618 additionally includes a GPS data storage component 624. In one embodiment, GPS data storage component 624 stores information regarding the location of the performance recording device while recording movements of the device. In one embodiment, GPS data may comprise the latitude, longitude, and altitude of the performance recording device. In one embodiment, GPS data may comprise a time sequence of GPS coordinates.

Performance database 618 additionally includes a sensor data storage component 626. In one embodiment, sensor data storage component 626 stores sensor data received from sensors within a performance recording device. In one embodiment, sensors may comprise gyroscopes, accelerometers, speedometers, pedometers, or other sensor recordings devices. In one embodiment, sensor data storage component 626 may store sensor data as a time-series of sensor readings.

Performance database 618 additionally includes an event data storage component 628. In one embodiment, event data storage component 628 stores information regarding events detected using the aforementioned information. Techniques for detecting events are discussed more fully with respect to FIGS. 1 through 3 and the disclosure of those Figures is incorporated herein in its entirety.

Figure 7:
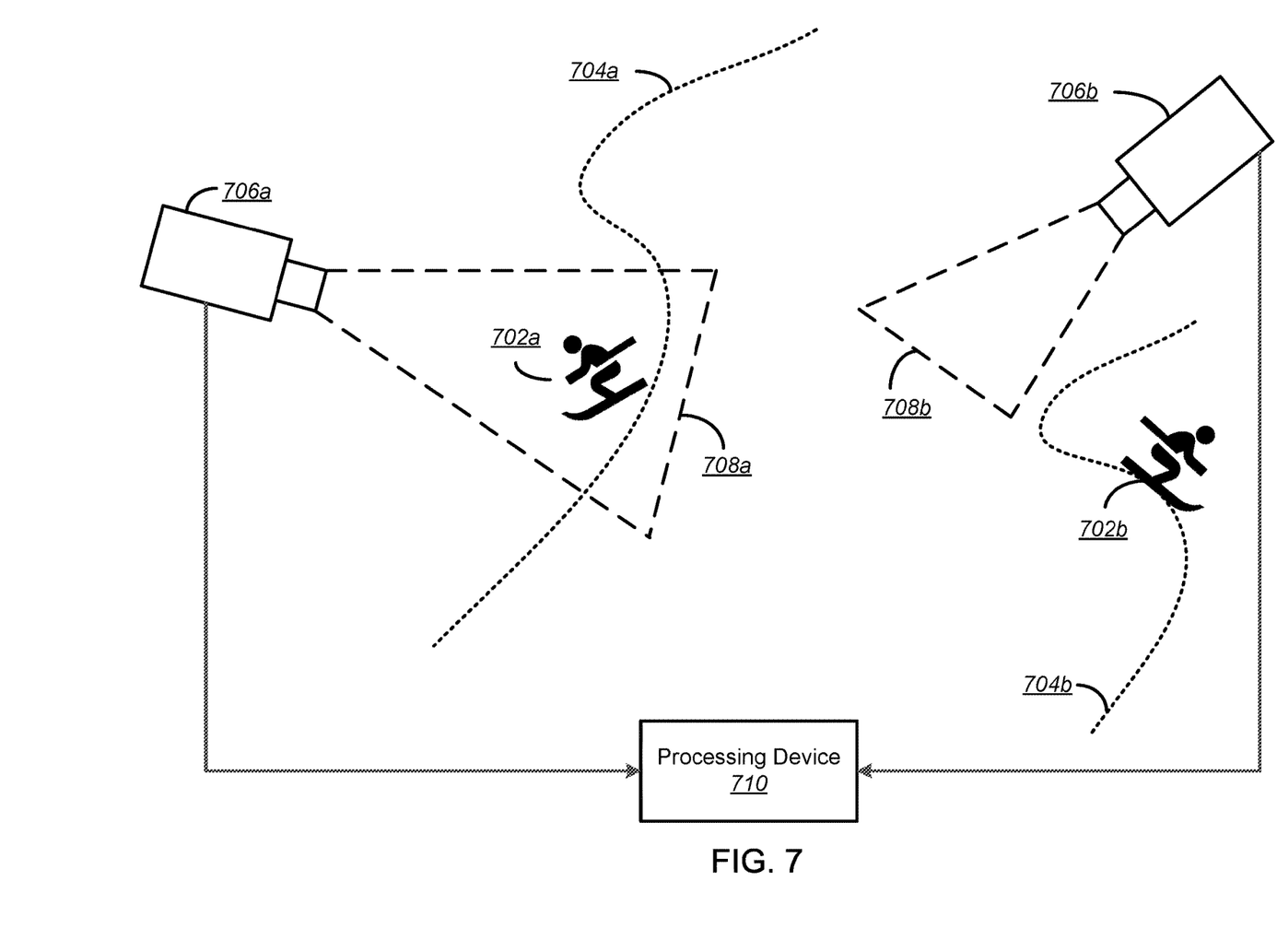
FIG. 7 is a block diagram illustrating a system for enhanced video image recognition according to one embodiment of the disclosure.

FIG. 7 is a block diagram illustrating a system for enhanced video image recognition according to one embodiment of the disclosure.

In the diagram illustrated in FIG. 7, two performers 702a, 702b are moving along trajectories 704a, 704b, respectively. As illustrated in the Figure, performers 702a, 702b may comprise athletes, such as skiers, and the performance may comprise a sporting event such as downhill or freestyle race. In one embodiment, trajectories 704a, 704b may comprise the path of the performers 702a, 702b determined based on sensor data recorded by devices (not illustrated) present on the performers 702a, 702b. In one embodiment, devices recording sensor record data may comprise a device such as that illustrated in FIG. 4, the description of which is incorporated herein in its entirety.

As illustrated in FIG. 7, two cameras 706a, 706b may be installed to record performers 702a, 702b. In one embodiment, cameras 706a, 706b may be pre-installed at an event location, such as the location of a sporting event. For example, as illustrated, a course designed for competitive skiing may have cameras 706a, 706b installed to record and/or broadcast skiing events taking place at the location.

Each camera 706a, 706b has an associated field of view 708a, 708b. In one embodiment, the field of view 708a, 708b of cameras 706a, 706b may comprise the surface area, in three dimensions, that cameras 706a, 706b capture at any given moment. In one embodiment, cameras 706a, 706b may be fixedly mounted and thus field of view 708a, 708b may be constant, that is, may record continuously a fixed portion of a location. In alternative embodiments, cameras 706a, 706b may be movable and thus field of view 708a, 708b may move in accordance with the movement of cameras 706a, 706b.

As illustrated, cameras 706a, 706b may be communicatively coupled to processing device 710. In the illustrated embodiment, cameras 706a, 706b may transmit video data to processing device 710 for storage and processing, as discussed in more detail with respect to FIGS. 1 through 3. Alternatively, or in conjunction with the foregoing, each performer 702a, 702b may be equipped with a performance recording device and may transmit sensor record data to processing device 710. In one embodiment, sensor record data may be transmitted to processing device 710 using a cellular connection. In alternative embodiments, sensor record data may first be transmitted to a server device (not illustrated) for processing prior to transmittal to processing device 710. In alternative embodiments, sensor record data may be stored locally by the device and transferred to processing device 710 at a later time and date. Notably, as illustrated, the trajectory 704a of performer 702a illustrates the scenario wherein the performed 702a is performing an event (e.g., a high speed event, jump, spin, etc.) wherein the performer is 702a is in the field of view 708a of camera 706a. Conversely, both performers 702a, 702b may be performing events while not in the field of view 708a, 708b of cameras 706a, 706b. As described in more detail herein, processing device 710 may be configured to detect an event performed by performer 702a using video data from camera 706a and sensor data transmitted by performer 702a. Notably, as discussed in more detail herein, processing device 710 may receive sensor data from performer 702a and be configured to identify camera 706a as the device providing corresponding video footage for events identified by performer 702a. The selection of cameras 706a, 706b is described more fully with respect to FIG. 2.

The subject matter described above may be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The description presented above is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method, comprising:
    selecting an event based on one or more sensor records, the one or more sensor records representing timestamped sensor data collected by a sensor recording device;
    identifying a time associated with the event;
    retrieving a plurality of timestamped video frames associated with the event;
    synchronizing the one or more sensor records and the plurality of timestamped video frames, wherein synchronizing the one or more sensor records and the plurality of timestamped video frames comprises synchronizing the timestamped sensor data with individual frames of the plurality of timestamped video frames; and
    selecting a subset of video frames from the plurality of timestamped video frames based on the selected event.

2. The method of claim 1, wherein the selecting the subset of video frames further comprises selecting a portion of each of the subset of video frames, the subset of video frames selected based on determining a mapping between a three-dimensional coordinate and a two-dimensional camera image pixel space.

3. The method of claim 1, further comprising performing image recognition on the subset of video frames selected.

4. The method of claim 3, wherein the performing image recognition on the subset of video frames selected comprises:
    training a machine learning algorithm using at least one video frame from the subset of video frames, the machine learning algorithm configured to automatically detect participants in a set of video frames;
    receiving a second subset of video frames;
    providing the second subset of frames to the machine learning algorithm; and
    classifying one or more frames of the second subset of frames based on a detection of a participant within the one or more frames by the machine learning algorithm.

5. The method of claim 1, wherein the selecting the subset of video frames from the plurality of timestamped video frames based on the selected event comprises calculating a time period based on a time associated with the event and selecting one or more of the plurality of timestamped video frames occurring within the time period.

6. The method of claim 1, wherein the identifying the time associated with the event further comprises determining a position and duration of the event based on the one or more sensor records.

7. The method of claim 1, wherein the plurality of timestamped video frames are each associated with metadata wherein the metadata includes a user identifier representing a user present within the plurality of timestamped video frames.

8. The method of claim 1, further comprising calibrating one or more cameras after synchronizing the one or more sensor records and the plurality of timestamped video frames, wherein the calibrating comprises:
    identifying one or more unknown parameters of the one or more cameras which are operational, the one or more unknown parameters relating to a field of view of the one or more cameras which are operational cameras;
    determining a three-dimensional position of a participant appearing in the subset of video frames based on the one or more sensor records;
    determining a two-dimensional position of one or more pixels containing the participant; and
    utilizing camera calibration algorithm to generate the one or more unknown parameters of the operational cameras based on correspondence between the three-dimensional position and the two-dimensional position.

9. The method of claim 1, further comprising:
    calculating a three-dimensional position of the sensor recording device for each frame in the subset of video frames;
    determining a set of image areas for each frame in the subset of video frames, the set of image areas framing a participant equipped with the sensor recording device; and
    digitally zooming each frame in the subset of video frames based on the set of image areas.

10. A system, comprising:
    a sensor recording device configured to capture one or more sensor records, the one or more sensor records representing timestamped sensor data collected by the sensor recording device;
    one or more cameras configured to record a plurality of timestamped video frames; and
    an event processing system configured to:
        select an event based on the one or more sensor records;
        identify a time associated with the event;
        retrieve the plurality of timestamped video frames;
        synchronize the one or more sensor records and the plurality of timestamped video frames, wherein synchronizing the one or more sensor records and the plurality of timestamped video frames comprises synchronizing the timestamped sensor data with individual frames of the plurality of timestamped video frames; and
        select a subset of video frames from the plurality of timestamped video frames based on the selected event.

11. The system of claim 10, wherein selecting the subset of video frames further comprises selecting a portion of each of the subset of video frames, the subset of video frames selected based on a determination of a mapping between a three-dimensional coordinate and a two-dimensional camera image pixel space.

12. The system of claim 10, wherein the event processing system is further configured to perform image recognition on the subset of video frames selected.

13. The system of claim 12, wherein the performing image recognition on the subset of video frames selected comprises:
    training a machine learning algorithm using at least one video frame from the subset of video frames, the machine learning algorithm configured to automatically detect participants in a set of video frames;
    receiving a second subset of video frames;
    providing the second subset of frames to the machine learning algorithm; and
    classifying one or more frames of the second subset of frames based on a detection of a participant within the one or more frames by the machine learning algorithm.

14. The system of claim 10, wherein the selecting the subset of video frames from the plurality of timestamped video frames based on the selected event comprises calculating a time period based on a time associated with the selected event and selecting one or more of the plurality of timestamped video frames occurring within the time period.

15. The system of claim 11, wherein identifying the time associated with the event further comprises determining a position and duration of the event based on the one or more sensor records.

16. The system of claim 10, wherein the plurality of timestamped video frames are each associated with metadata wherein the metadata includes a user identifier representing a user present within the plurality of timestamped video frames.

17. The system of claim 10, wherein the event processing system is further configured to calibrate one or more cameras after synchronizing the one or more sensor records and the plurality of timestamped video frames, wherein the calibrating comprises:
    identifying one or more unknown parameters of the one or more cameras which are operational, the one or more unknown parameters relating to a field of view of the one or more cameras which are operational;
    determining a three-dimensional position of a participant appearing in the subset of video frames based on the one or more sensor records;
    determining a two-dimensional position of one or more pixels containing the participant; and
    utilizing camera calibration algorithm to generate the one or more unknown parameters of the one or more cameras which are operational based on correspondence between the three-dimensional position and the two-dimensional position.

18. The system of claim 10, wherein the event processing system is further configured to:
    calculate a three-dimensional position of the sensor recording device for each frame in the subset of video frames;
    determine a set of image areas for each frame in the subset of video frames, the set of image areas framing a participant equipped with the sensor recording device; and
    digitally zoom each frame in the subset of video frames based on the set of image areas.

* * * * *